US012717866B2

(12) United States Patent
Lee

(10) Patent No.: US 12,717,866 B2
(45) Date of Patent: Aug. 25, 2026

(54) APPARATUS FOR SOLVING CIRCUIT EQUATIONS OF PROCESSING ELEMENTS USING NEURAL NETWORK AND METHOD FOR CONTROLLING THE SAME

(71) Applicant: Chaeun Lee, Yecheon-gun (KR)

(72) Inventor: Chaeun Lee, Yecheon-gun (KR)

( * ) Notice: Subject to any disclaimer, the term of this patent is extended or adjusted under 35 U.S.C. 154(b) by 855 days.

(21) Appl. No.: 18/099,735

(22) Filed: Jan. 20, 2023

(65) Prior Publication Data

US 2023/0229729 A1 Jul. 20, 2023

(30) Foreign Application Priority Data

Jan. 20, 2022 (KR) ........................ 10-2022-0008843

(51) Int. Cl.
*G06F 17/15* (2006.01)
*G06N 3/065* (2023.01)

(52) U.S. Cl.
CPC ........... *G06F 17/153* (2013.01); *G06N 3/065* (2023.01)

(58) Field of Classification Search
CPC ...... G06F 17/153; G06N 3/063; G06N 3/065; G06N 3/082; G06T 1/20; G11C 13/00
See application file for complete search history.

(56) References Cited

U.S. PATENT DOCUMENTS

2020/0310758 A1* 10/2020 Desoli ...................... G06N 3/04
2021/0089893 A1* 3/2021 Choi ....................... G06F 17/18
2021/0191733 A1* 6/2021 Gunnam ................ G06N 3/045
2022/0019408 A1* 1/2022 Kim .......................... G06F 7/57
2022/0108158 A1* 4/2022 Grobis ................. G06N 3/0464
2022/0269930 A1* 8/2022 Lee ......................... G06F 17/16

OTHER PUBLICATIONS

Li, Ying, Haokui Zhang, and Qiang Shen. "Spectralâspatial classification of hyperspectral imagery with 3D convolutional neural network." Remote Sensing 9.1 (2017): 67. (Year: 2017).*
Gnawali, Krishna Prasad, et al. "Reliability enhancements in memristive neural network architectures." IEEE Transactions on Nanotechnology 18 (2019): 866-878. (Year: 2019).*
Lee, Jaeheum, et al. "Adaptive precision cnn accelerator using radix-x parallel connected memristor crossbars." arXiv preprint arXiv:1906.09395 (2019). (Year: 2019).*

(Continued)

*Primary Examiner* — Randall K. Baldwin
(74) *Attorney, Agent, or Firm* — Maine Cernota & Curran

(57) ABSTRACT

According to various embodiments of the present disclosure, a method for solving circuit equations of a processing element (PE) using a neural network by a graphic processing unit (GPU) comprising: forming M aligned virtual cell arrays in the neural network, wherein the cell arrays have a height value N and a width value O, each virtual cell array corresponding to a crossbar array circuit included in a processing element; performing 3D convolution on each of the virtual cell arrays until the height value N of each of the virtual cell arrays becomes 1; inputting parameters of the memory cells of the crossbar array to each of the virtual cell arrays in which the three-dimensional convolution is performed; and solving a circuit equation of the processing element using the output value of the virtual cell arrays.

10 Claims, 11 Drawing Sheets

(56) References Cited

OTHER PUBLICATIONS

Sun, Wookyung, et al. "Three-dimensional (3D) vertical resistive random-access memory (VRRAM) synapses for neural network systems." Materials 12.20 (2019): 3451. (Year: 2019).*
Fernando, B. Rasitha, et al. "3D memristor crossbar architecture for a multicore neuromorphic system." 2020 International Joint Conference on Neural Networks (IJCNN). IEEE, 2020. (Year: 2020).*
Kwak, Hyunjeong, et al. "Experimental measurement of ungated channel region conductance in a multi-terminal, metal oxide-based ECRAM." Semiconductor Science and Technology 36.11 (2021): 114002. (Year: 2021).*
Lees, Chaeun, and Seyoung Kim. "SEMULATOR: Emulating the Dynamics of Crossbar Array-based Analog Neural System with Regression Neural Networks." arXiv preprint arXiv:2101.07864 (Jan. 19, 2021). (Year: 2021).*
Elbtity, Mohammed, et al. "An in-memory analog computing co-processor for energy-efficient cnn inference on mobile devices." 2021 IEEE Computer Society Annual Symposium on VLSI (ISVLSI). IEEE, 2021. (Year: 2021).*
Lee, Chaeun, et al. "Impact of asymmetric weight update on neural network training with tiki-taka algorithm." Frontiers in neuroscience 15 (Jan. 6, 2022): 767953. (Year: 2022).*

* cited by examiner

FIG. 4

APPARATUS FOR SOLVING CIRCUIT EQUATIONS OF PROCESSING ELEMENTS USING NEURAL NETWORK AND METHOD FOR CONTROLLING THE SAME

CROSS-REFERENCE TO RELATED APPLICATION

This application claims priority to and the benefit of Korean Patent Application No. 10-2022-0008843, filed on Jan. 20, 2022, the disclosure of which is incorporated herein by reference in its entirety.

BACKGROUND

1. Field of the Invention

The present application relates to a device for solving a circuit equation of a processing element using a neural network and a method for controlling thereof. Specifically, the present application relates to a device implemented by emulating an analog computing block of a CPU (Central Processing Unit) stage in a GPU (Graphic Processing Unit) environment and a method for controlling thereof.

2. Description of the Related Art

There are several types of simulators for analog neural networks. First, a simulator such as SPICE composes circuit equations and iteratively solves linear or linearly approximated equations. In addition, SPICE has the disadvantage of designing the entire system with SPICE code and waiting a long time to simulate a neural network.

Second, in the case of a functional modeling-based simulator, each component of an analog neural network is approximated with a high-level programming language such as Python. Those skilled in the art approximate the functions of various types of memory elements by considering the physical operation and dynamics of the circuit. Therefore, all components compatible with deep learning frameworks can be integrated in Python.

All of the above-described simulators have a disadvantage in that a person needs to design the entire system or each component of the analog neural network, so that a person needs to do all the work himself, requiring effort and time. In particular, in the case of implementing a simulator by SPICE, there is a disadvantage that a lot of time is required for simulation.

SUMMARY OF THE INVENTION

The present application has been devised to solve the above-mentioned problems. According to the present application, efforts to directly model all components by implementing a statistics modeling-based simulator can be replaced with a neural network that implements a virtual crossbar array circuit. In addition, by implementing the crossbar array circuit in the GPU stage, the operation time can be reduced and the circuit characteristics can be solved more accurately compared to simulators implemented and operated in the CPU stage.

The technical problems to be achieved in the present invention are not limited to the technical problems mentioned above, and other technical problems not mentioned can be clearly understood by those of ordinary skill in the art from the description below.

According to various embodiment of the present application, a method for solving circuit equations of a processing element (PE) using a neural network by a graphic processing unit (GPU) comprises forming M aligned virtual cell arrays in the neural network, wherein the cell arrays have a height value N and a width value O, each virtual cell array corresponding to a crossbar array circuit included in a processing element, performing 3D convolution on each of the virtual cell arrays until the height value N of each of the virtual cell arrays becomes 1, inputting parameters of the memory cells of the crossbar array to each of the virtual cell arrays in which the three-dimensional convolution is performed, solving a circuit equation of the processing element using the output value of the virtual cell arrays.

According to an embodiment of the present application, wherein the memory cell consists of one resistor memory and one transistor, one resistor memory and one selector, or one resistor memory.

According to an embodiment of the present application, wherein the parameter of the memory cell comprises parameters which are set as variables from parameters of the conductance of the memory element of the memory cell, the voltage applied to the memory cell, the threshold voltage of the memory cell, and the width/length ratio of the transistor of the memory cell.

According to an embodiment of the present application, wherein the processing element further comprises peripheral circuitry, the method further comprises, solving a circuit equation of the processing element using the output value and circuit characteristics of the peripheral circuit.

According to an embodiment of the present application, solving a circuit equation of the processing element using the output value and circuit characteristics of the peripheral circuit comprises, solving the circuit equation using a Fully Connected Neural Network (FCNN) or Neural Ordinary Differential Equation (ODE).

According to an embodiment of the present application, wherein the 3D convolution is performed over M arrays.

According to various embodiment of the present application, a device for solving circuit equations of a processing element (PE) using a neural network by a graphic processing unit (GPU), the graphic processing unit forms M aligned virtual cell arrays in the neural network, wherein the cell arrays have a height value N and a width value O, each virtual cell array corresponding to a crossbar array circuit included in a processing element, performs 3D convolution on each of the virtual cell arrays until the height value N of each of the virtual cell arrays becomes 1, inputs parameters of the memory cells of the crossbar array to each of the virtual cell arrays in which the three-dimensional convolution is performed, solves a circuit equation of the processing element using the output value of the virtual cell arrays.

A device according to claim 7, wherein the parameter of the memory cell comprises parameters which are set as variables from parameters of the conductance of the memory element of the memory cell, the voltage applied to the memory cell, the threshold voltage of the memory cell, and the width/length ratio of the transistor of the memory cell.

A device according to claim 7, wherein the processing element further comprises peripheral circuitry, wherein the graphic processing unit solves a circuit equation of the processing element using the output value and circuit characteristics of the peripheral circuit.

A device according to claim 7, wherein the graphic processing unit solves the circuit equation using a Fully Connected Neural Network (FCNN) or Neural Ordinary Differential Equation (ODE).

BRIEF DESCRIPTION OF THE DRAWINGS

The above and other objects, features and other advantages of the present disclosure will be more clearly understood from the following detailed description taken in conjunction with the accompanying drawings, in which:

FIG. 4 is a diagram for illustrating a process of performing 3D convolution on an array of neural networks according to various embodiments of the present application.

DETAILED DESCRIPTION OF THE INVENTION

Figure 1:
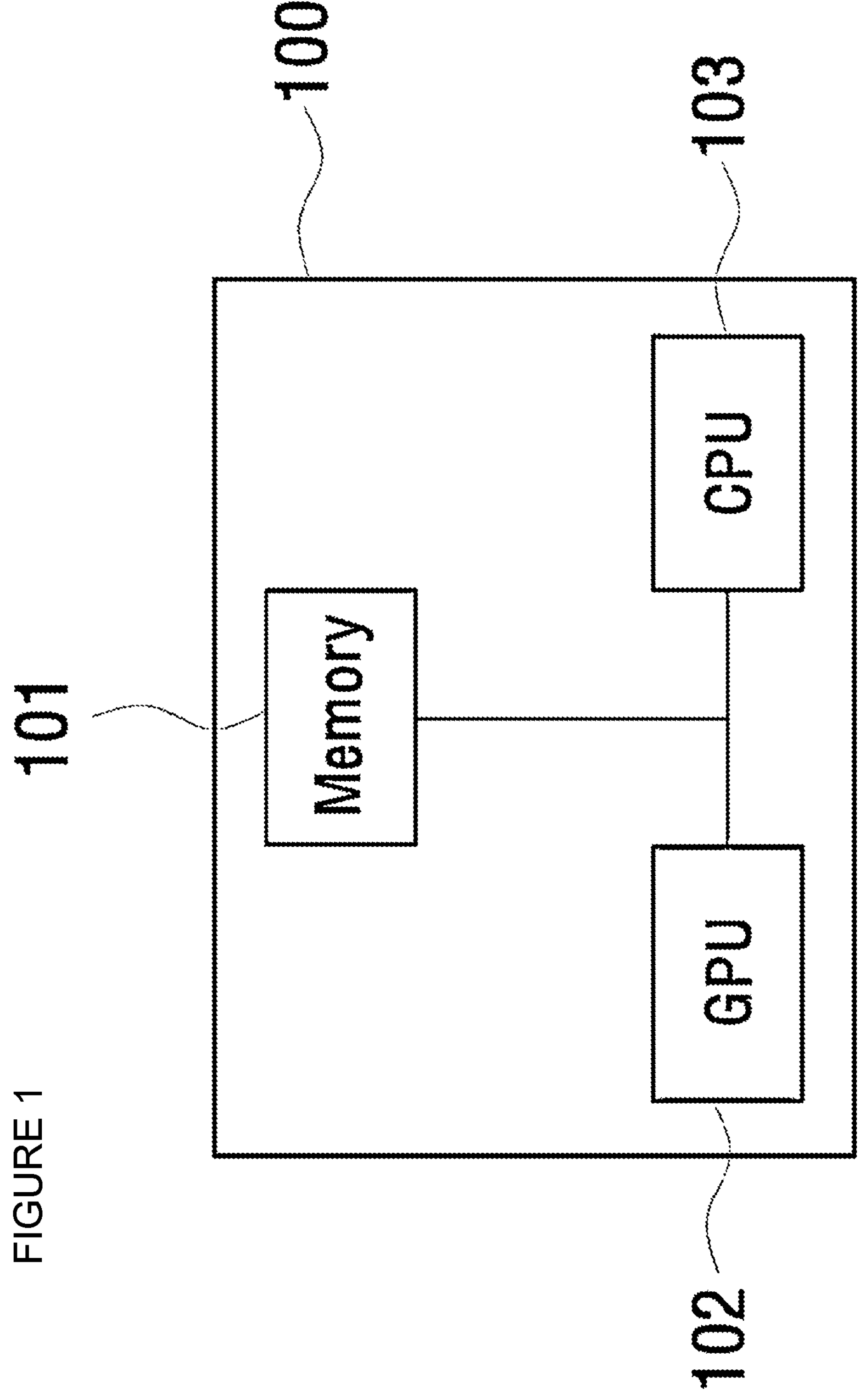
FIG. 1 is a block diagram of a device for solving a circuit equation of a processing element using a neural network according to various embodiments of the present disclosure.

Advantages and features of the present invention and methods of achieving them will become apparent with reference to the embodiments described below in detail in conjunction with the accompanying drawings. However, the present invention is not limited to the embodiments disclosed below, but will be implemented in a variety of different forms, and only these embodiments allow the disclosure of the present invention to be complete, and common knowledge in the technical field to which the present invention belongs. It is provided to fully inform the possessor of the scope of the invention, and the present invention is only defined by the scope of the claims.

The shapes, sizes, proportions, angles, numbers, etc. disclosed in the drawings for explaining the embodiments of the present invention are illustrative and the present invention is not limited to the illustrated matters. Like reference numerals refer to like elements throughout. In addition, in describing the present invention, if it is determined that a detailed description of a related known technology may unnecessarily obscure the subject matter of the present invention, the detailed description thereof will be omitted. When 'including', 'having', 'consisting', etc. mentioned in this specification are used, other parts may be added unless 'only' is used. When a component is expressed in the singular, the case in which the plural is included is included unless otherwise explicitly stated.

In interpreting the components, it is interpreted as including an error range even if there is no explicit description.

In the case of a description of the positional relationship, for example, when the positional relationship of two parts is described as 'on', 'on', 'on', 'beside', etc., 'right' Alternatively, one or more other parts may be positioned between two parts unless 'directly' is used.

Although first, second, etc. are used to describe various elements, these elements are not limited by these terms. These terms are only used to distinguish one component from another. Accordingly, the first component mentioned below may be the second component within the spirit of the present invention.

The same reference numerals refer to the same elements throughout.

The size and thickness of each component shown in the drawings are illustrated for convenience of description, and the present invention is not necessarily limited to the size and thickness of the illustrated component.

Each feature of the various embodiments of the present invention may be partially or wholly combined or combined with each other, and as those skilled in the art will fully understand, technically various interlocking and driving are possible, and each embodiment may be independently implemented with respect to each other, It may be possible to implement together in a related relationship.

Hereinafter, an embodiment according to the present invention will be described in detail with reference to the accompanying drawings. A plurality of embodiments described below may be repeatedly applied as long as they do not conflict with each other.

In this specification, the term "neural network" may refer to software that implements statistical learning algorithms that are helpful in adaptive environments and useful for machine learning. A neural network may include a plurality of artificial nodes known as "Neurons", "processing elements", "units", or other similar terms. A plurality of artificial nodes can be connected together to form a network that mimics a biological neural network.

In some related fields, a neural network may include sets of adaptive weights (e.g., numerical parameters tuned by a learning algorithm), and approximate non-linear functions for the input thereof. Adaptive weights may conceptually relate to connection strengths between neurons, and be activated during training and prediction.

In some related fields, neural networks may operate on the principles of non-linear, distributed, parallel local processing and adaptation. In some related fields, the first layer may be referred to as the "input layer" and the neurons within this layer may be referred to as input neurons. An "output layer" may include output neurons. The middle layers may be called "hidden layers" because the neurons in these layers are neither input neurons nor output neurons. Neurons may include feature detectors, gradients, and other components.

In some related fields, "Convolution" may be a mathematical operation on two functions f and g, as is well known.

In some related arts, the term "Convolutional Neural Network" may refer to a type of neural network in which individual neurons are tiled to correspond to overlapping regions of the visible field. A convolutional neural network will employ Local Receptive Fields, Shared Weights, and Pooling to process the image.

Local receptive fields can be thought of as connections of input pixels into a layer of hidden neurons. As an example, each neuron in the first hidden layer may correspond to a small, localized region of the input image. The region of the input image corresponding to a hidden neuron may be referred to as a "local receptive field" for that hidden neuron. Each of the hidden neurons in the first hidden layer can use the same weights and biases as the other hidden neurons, and thus have "shared weights". This may mean that all neurons in the first hidden layer can detect exactly the same feature at just different locations.

The resulting map from the input layer may be referred to as "feature map", and the weights defining the feature map may be referred to as "shared weights". "Pooling layers" may be used immediately after convolutional layers. Pooling layers can simplify the information included in the output from the convolution layer. That is, the pooling layer can bring each feature map output from the convolution layer and prepare a summarized feature map. One procedure for pooling is known as "Max-pooling". In max pooling, the pooling unit can simply output the maximum activation (Maximum Activation) of the input region (output from the feature map).

Deep convolutional neural networks can be described as stacking have normalization layers, pooling layers (which spatially downsample the input), and/or convolutional layers interlaced with other types of layers with the top fully connected layers and cost layers (e.g., logistic regression). Each convolution layer can be parameterized by a set of filters (e.g., a first layer filter that takes an RGB image as an input and provides a response). The power of deep convolutional neural networks comes from deeply layered layers, which start with simple features (e.g. raw RGB image data) and learn increasingly complex features through deeply layered layers, thus subsequent layers may be used to identify high level semantics.

In this specification, the term "filter" or "kernel" may refer to a hierarchy of connection weights. When using an image as an input to a filter, this input may contain a small two-dimensional patch of image, then the output may be a single unit. Since the filter is applied repeatedly, the resulting connection can look like a series of overlapping receptive fields.

In this specification, the term "feature detector" may refer to a set of techniques that learn transformations of data inputs and provide representations that can be used by neural networks.

In exemplary embodiments, the methods and apparatus described herein may be useful for training neural networks. A neural network may be constructed by learning using a set of reference image data. However, exemplary embodiments are merely illustrative of the teachings of this specification and does not limit the scope of the present application. Thus, the described methods and apparatus can be used equally well for other applications involving the use of neural networks.

FIG. 1 is a block diagram of a device for solving a circuit equation of a processing element using a neural network according to various embodiments of the present application.

Referring to FIG. 1, aspects of an exemplary, non-limiting embodiment of a computing system 100 are shown. The computing system 100 may include a memory 101, a GPU 102, and a CPU 103. The computing system 100 may include various components, such as a communication interface and an input/output interface, which are not shown in FIG. 1, and the computing system 100 of the present application is not limited by the device of FIG. 1.

The memory 101 is a device for storing information or instructions as well as results of calculation processing inside a computer, and may refer to a device mainly used as a storage space. The GPU 102 may refer to a semiconductor core chip or device dedicated to graphics operation processing in a computer. The GPU 102 may refer to devices that are in charge of image information processing, acceleration, signal conversion, screen output, etc. in the computer, and aims to reduce the burden on the CPU and maximize graphics processing capability by processing the graphics part of the functions processed by the CPU 103 instead. The CPU 103 is a central processing unit and may refer to a core device of a computer system that controls processing such as interpretation of commands and calculation and comparison of data.

Solving the circuit equation of the processing element using the neural network of the present application implemented in the computing system 100 as shown in FIG. 1 will be described in detail in the drawings below.

In the present application, the memory architecture in the crossbar array of a processing element is implemented to load weights of an artificial neural network in the form of matrices. In the crossbar array circuit, MAC (Multiply-accumulate) operation, which is the basic operation of artificial neural networks that perform multiplication and addition operations, is "naturally" implemented by Kirchhoff's circuit law in the process of reading memory.

Figure 2A:
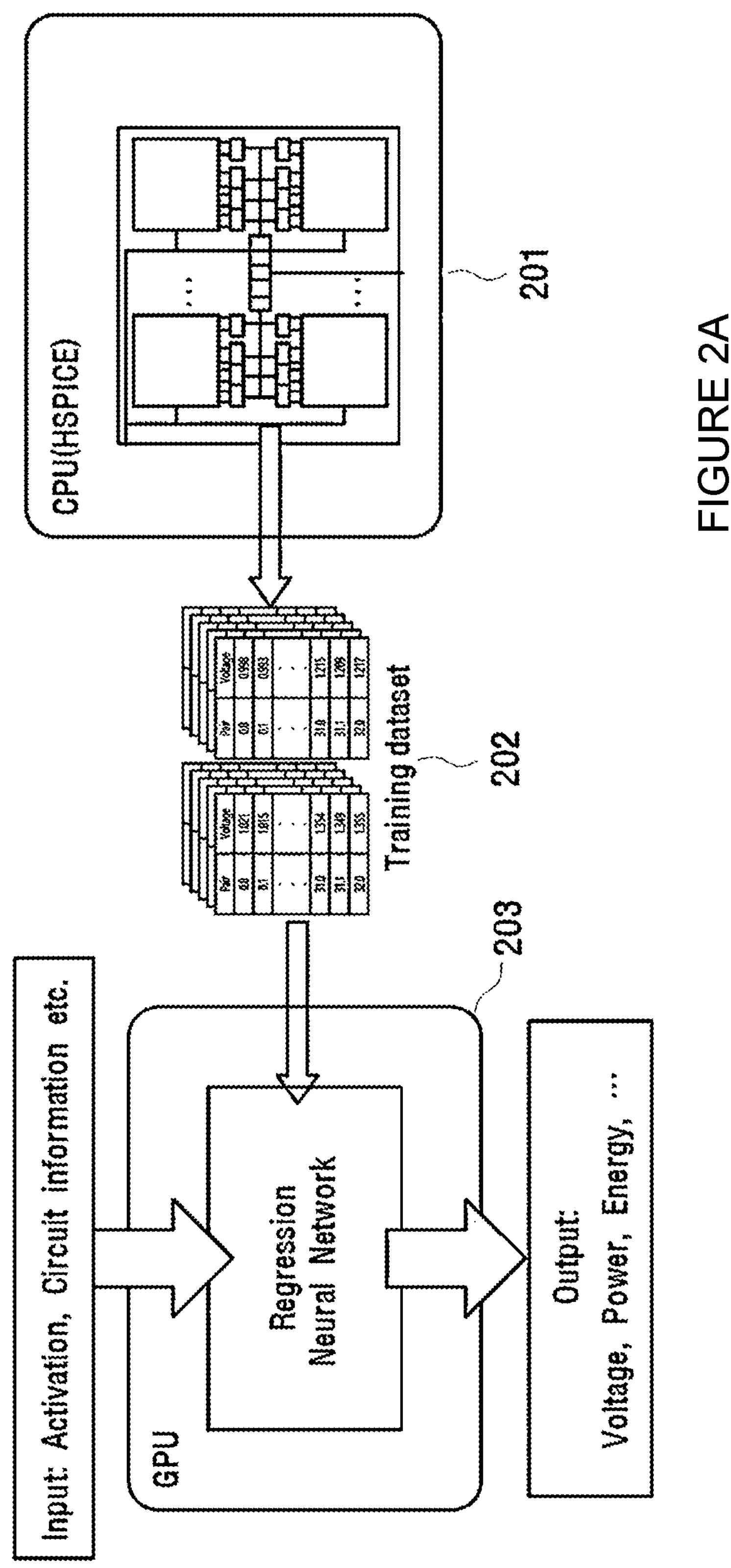
FIG. 2A is a diagram for explaining input and output using a neural network according to various embodiments of the present application.
Figure 2B:
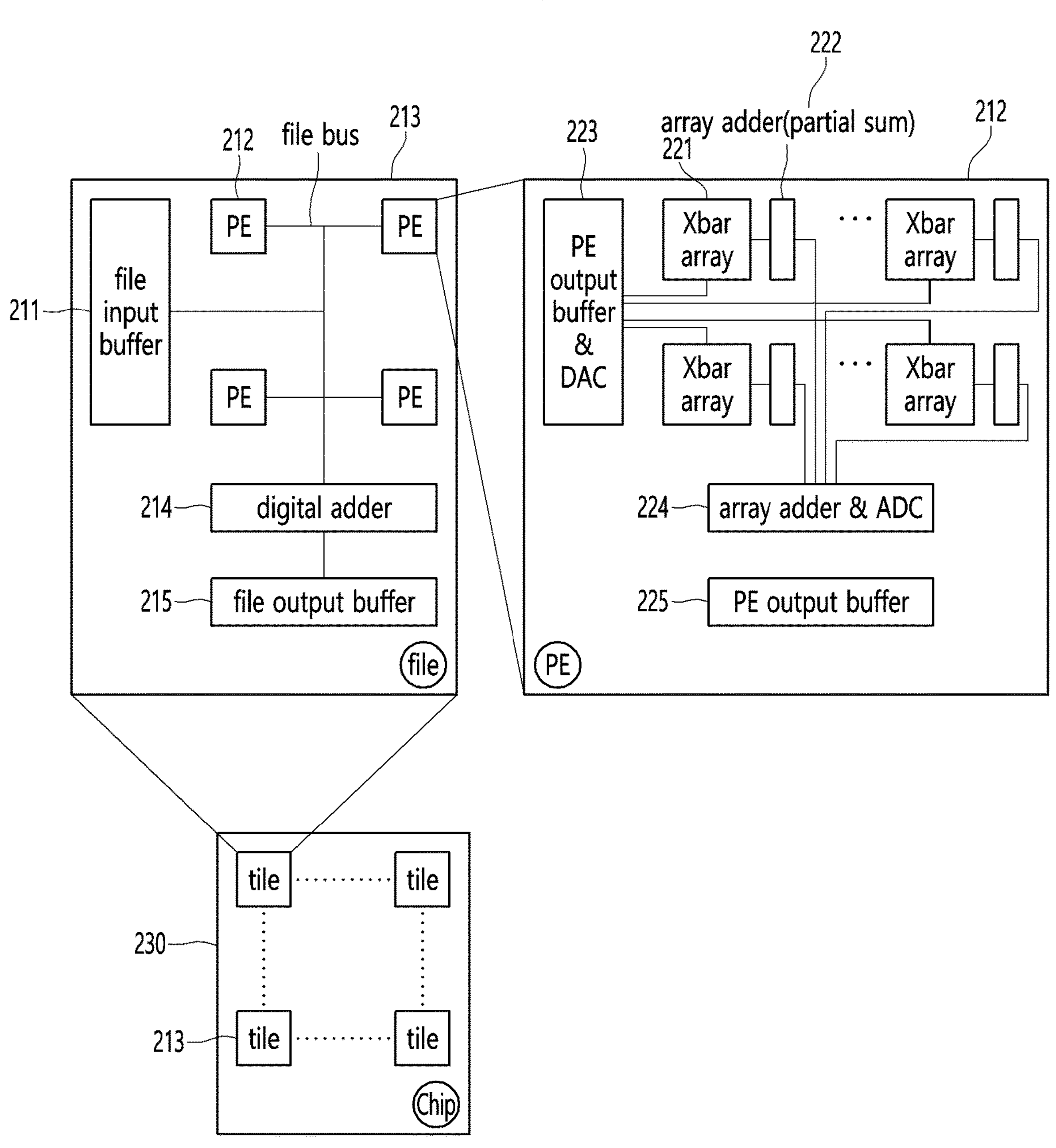
FIG. 2B is a diagram for explaining processing elements according to various embodiments of the present disclosure.

FIG. 2A is a diagram for explaining input and output using a neural network according to various embodiments of the present application. FIG. 2B is a diagram for explaining processing elements according to various embodiments of the present disclosure.

As described in the Description of the Related Art, in the analog computing method, a crossbar array circuit may be implemented using a circuit simulator such as HSPICE at the CPU 201 stage. Due to the nature of analog computing, an accurate circuit simulator such as SPICE is required, but it takes a lot of time to simulate a complex system such as a neural network. Considering that research on deep learning is being actively conducted with the development of GPUs, low-speed simulators used in analog computing systems are not suitable in terms of time resources.

Accordingly, in the present application, a method of implementing a processing element corresponding to an analog computing block on an analog computing system using a regression neural network in a GPU 203 environment will be discussed. Referring to FIG. 2B showing the processing element described herein, the processing element is the same as the generally referred to processing element in terms of functionality (the minimum unit that performs matrix vector multiplication (MVM)), but in this application, the processing element is defined as a unit that a pair of a digital-to-analog converter and an analog-to-digital converter is required to convert digitized input signal to analog signal and analog output signal to digitized signal. Since the processing element herein aims at pure analog computing inside the processing element, an analog adder tree is used instead of a digital adder tree. A chip 230 specialized in neural network operation is used as a neural network accelerator in an embedding system or data center. One chip 230 may be composed of a plurality of tiles 213 and additional circuits such as a controller. One tile 213 is a unit capable of completely parallelizing one or more operands, and includes a plurality of processing elements 212, an input buffer 211, a digital adder 214, and an output buffer 215 and other controllers. The input/output buffers 211 and 215 are memory for temporarily storing operands and operation results before moving them to off-chip memory. The digital adder 214 is a device for summing the digitized result signals of each processing element. In the present application, one processing element 212 refers to a computing block or processor composed of digital inputs and outputs and internally processing all data as analog signals.

Each processing element 212 is composed of a plurality of crossbar arrays 221, an analog adder for computing partial sum 222, input/output buffers 223 and 225, and DAC/ADCs 223 and 224. The analog adder 222 is composed of analog circuits, and refers to a series of circuits that integrates analog signals such as current or voltage. The input/output buffers 223 and 225 are memory for temporarily storing digitized data transmitted from tiles. Analog signal converted from data in the input buffer and DAC is transmitted to the crossbar array 221, and the operation result is converted into digitized data again through the analog adder, ADC 224, and stored in the output buffer 225. The converted result is sent to the digital adder via the bus within the tile and performs fully parallelized operations on the operands.

The regression neural network in the GPU 203 environment can be learned by the meaningful training data set 202 obtained by using SPICE simulation such as HSPICE in the CPU 201 environment. There are two methods of extracting the training data set 202. For example, from the results of transient analysis of SPICE simulations, the training data set 202 may be obtained by extracting 1) time sequential data from several time stamps, or 2) specific time stamp results after the response of the circuit has been stabilized (or converged). As will be described in detail in [Table 1] below, the experiment in [Table 1] used the method 2), and it may be possible to expand to the method 1), and the extraction method of the training data set 202 doesn't have limitations.

After the regression neural network is trained with the training data set whose targets may include the final output voltage of the processing element, overall power consumption, energy, etc., it can lead to almost the same result of HSPICE. Therefore, if circuit if of HSPICE are given as input to the neural network which is learned neural network, voltage, power, energy, etc. can be obtained as outputs, and characteristics of processing elements implemented by the neural network can be identified using the obtained outputs.

Since the above simulation is performed in a GPU environment rather than a CPU environment, the simulation speed is incomparably improved. In addition, the difficulty of implementation is reduced compared to the conventional technology in that it can be implemented by emulating a processing element without necessarily identically modeling the dynamics of an analog circuit and a memory device.

Figures 3A, 3B:
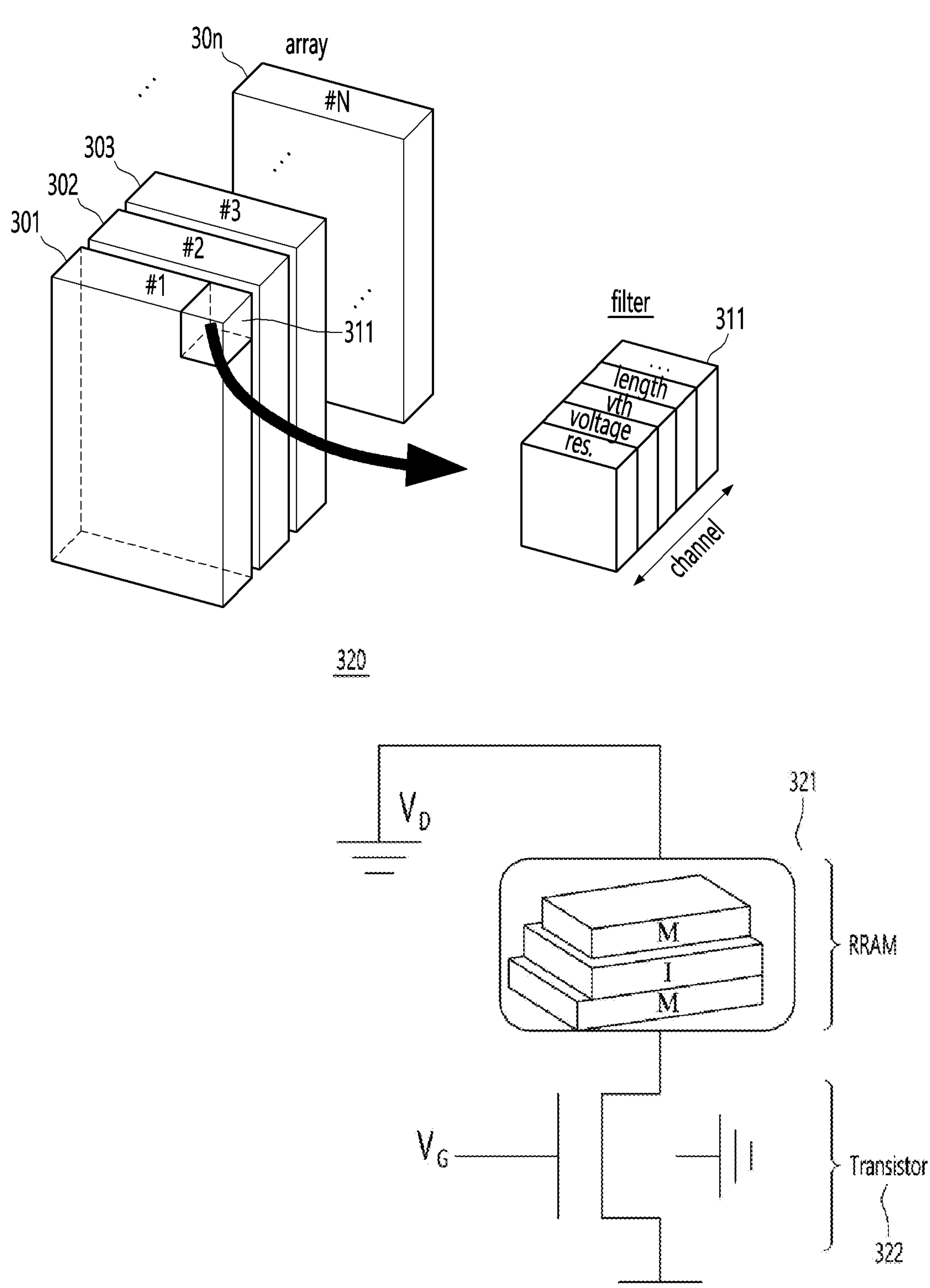
FIGS. 3A and 3B are diagrams for explaining a neural network array and memory cells constituting the neural network array according to various embodiments of the present application.

FIGS. 3A and 3B are diagrams for explaining virtual cell arrays which is the topology of an input tensor of a neural network to emulate a processing element and an exemplary physical memory device architecture constituting a memory array of a processing element according to various embodiments of the present application.

Referring to FIG. 3A, the input tensor may be composed of N virtual cell arrays 301, 302, 303, . . . 30N, and each array may be composed of virtual memory cells 311. Each of virtual memory cells 311 is mapped to multiple filters whose channels represent features of physical memory cells, and the entire array may implement a virtual crossbar array. Each virtual memory cell 311 has the same characteristics, and parameters and inputs of a physical memory cell of a crossbar array circuit simulated in SPICE may compose the input tensor aligned along channels.

Referring to FIG. 3B, which illustrates the memory cell 320 of the crossbar array, the memory cell 320 may consist of a single resistive memory (RRAM) 321 and a transistor 322. Accordingly, the circuit parameters of the memory cell may include parameter set as variables which become features of a virtual memory cell 311 such as resistance, applied voltage, and width/length ratio of a transistor of the memory cell. It will be taken for granted that a person skilled in the art can arbitrarily set variables among the above parameters.

Figure 6:
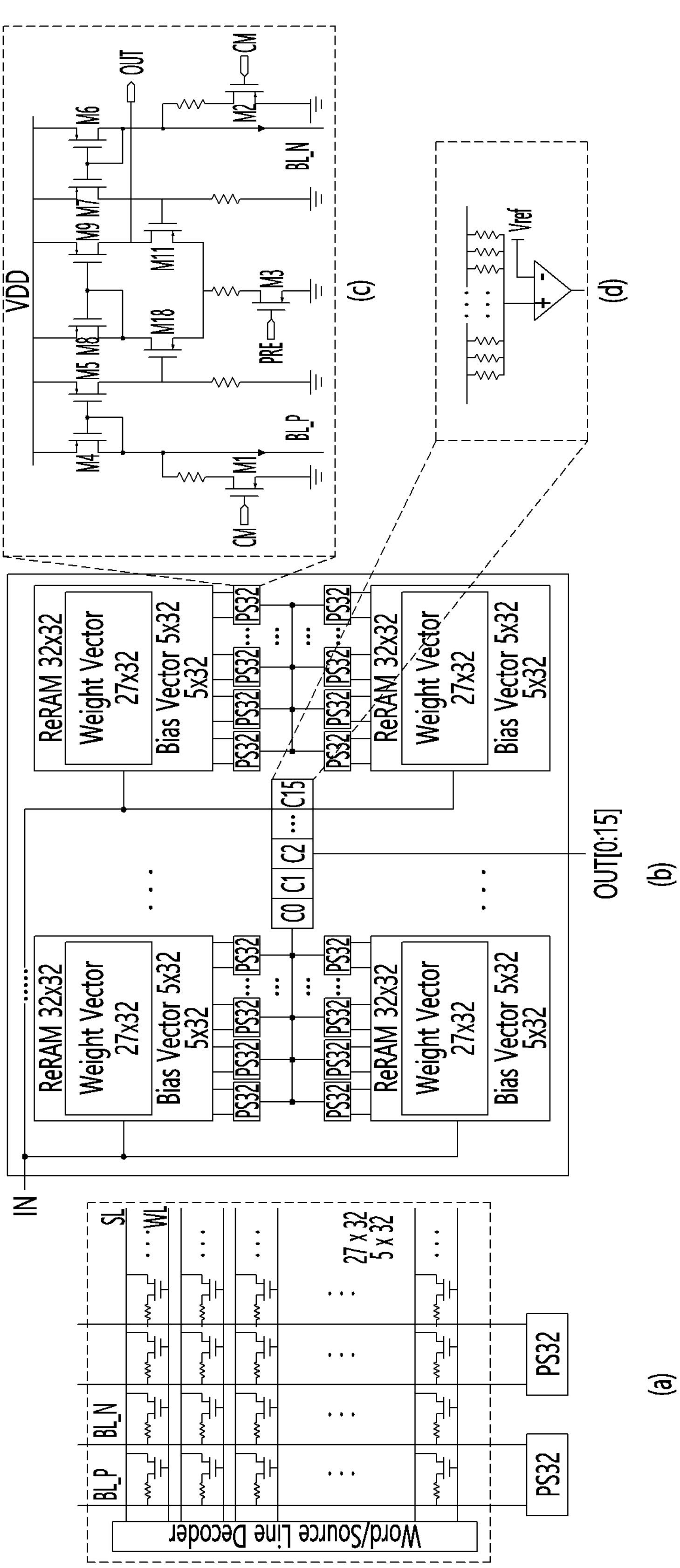
FIG. 6 is a diagram for explaining the RRAM and PS32 case according to an embodiment of the present application.

The processing element herein may be the processing element described in FIG. 2B and may be implemented using ReRam and PS32 as implemented in FIG. 6.

Figure 4:
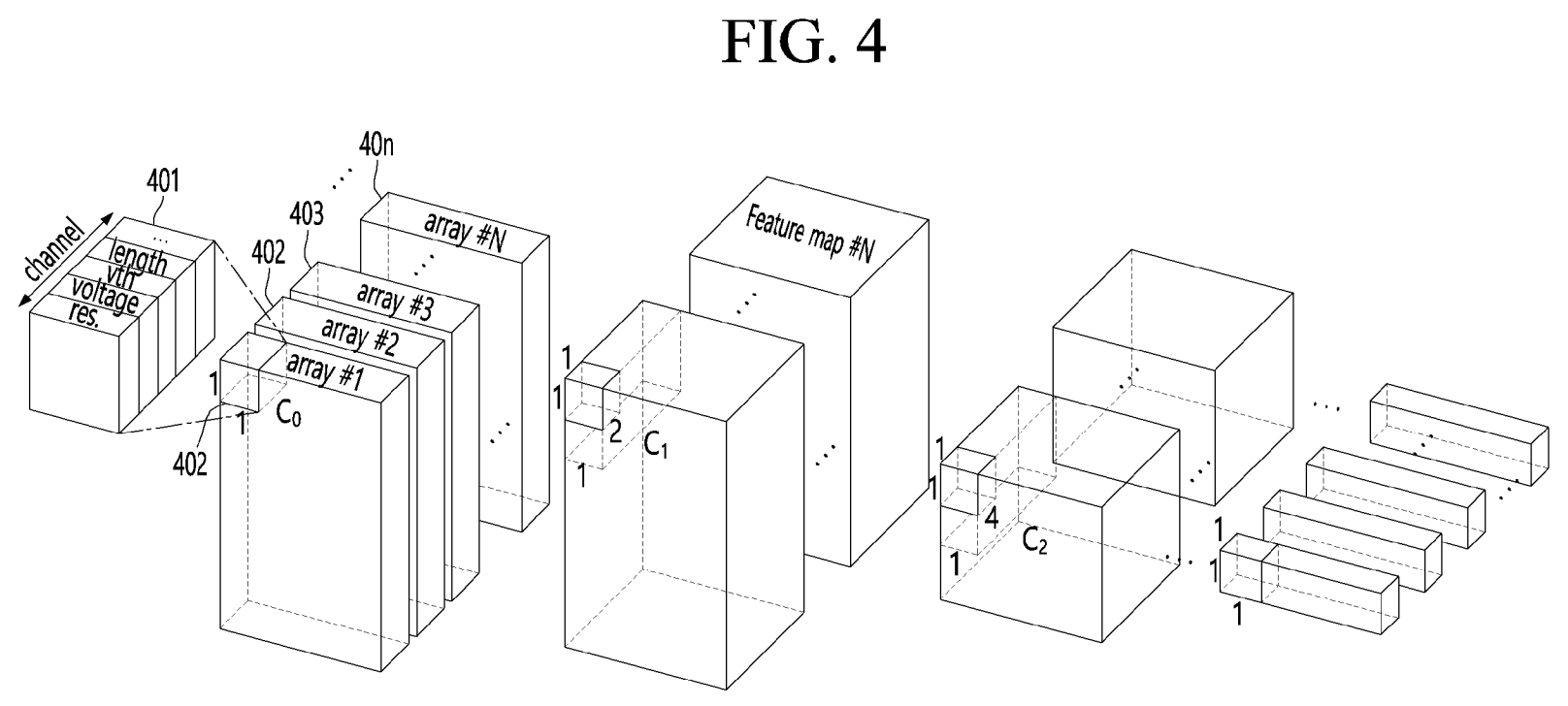

FIG. 4 is a diagram for illustrating a process of performing 3D convolution on an array of neural networks according to various embodiments of the present disclosure.

Referring to FIG. 4 for describing the neural network of the present application in detail, a box composed of solid lines in the feature map represents an output feature corresponding to a filter, and a dotted line box may represent a region of a filter for a corresponding stage. The input feature map 401 includes circuit parameters and inputs of memory cells of the crossbar array, such as resistance and applied voltage, and the total number of arrays may be composed of N arrays (e.g., individual virtual cell arrays 402, 403, . . . 40*n*) so that the entire neural network has N depths.

The operation of each cell in the crossbar array is mainly determined by cell characteristics such as voltage applied to the memory cell and conductance of a memory element in the cell. Thus, the operation of the crossbar array C(X) is formulated as:

$$C(X)=C'(d_{1,1,1}(x_{1,1,1}), \ldots ,d_{1,1,1}(x_{t,r,c})) \qquad \text{Equation 1}$$

Here, d_(t,r,c) (x_(t,r,c)) is a function that expresses the dynamics of the memory cell as the feature x_(t,r,c)∈R^f of the memory cell. Here, t is the index of the crossbar array, r is the index of the row where the memory cell is located in the crossbar array, c is the index of the column, and f is the number of features of the memory cell.

The characteristics of memory cells of all crossbar arrays can be gathered and expressed as tensor X=(x_ijk)∈R^(fXtXrXc), and the dynamics of all crossbar arrays, including the dynamics of memory cells may be expressed a function C:R ^(fXtXrXc)→R^1. In this case, 1 is a vector expressing a latent feature of the crossbar array, and 1 can be defined as a multiple of c·t when the current is designed to accumulate along a column of the crossbar array. C^' is the function that includes parasitic elements such as line resistance, load resistance, and parasitic capacitance generated by weaving memory cells and d_(t,r,c) in a crossbar array. C^' is the function that expresses the dynamics inside the crossbar array excluding memory cells.

Characteristics of the memory cell may vary according to the selection of the memory cell. For example, a 1R cell has two characteristics: the voltage applied to the memory cell and the conductance of the memory device. Or, a 1T1R memory cell contains one additional transistor with characteristics such as threshold voltage and width/length ratio, so the memory cell may have four characteristics.

In most cases of a crossbar array, d_(i,j,k)(') has almost the same form d(') because the structure of all memory cells is similar, which means that the function d(') is shared across all memory cells along row, column and array index. As shown in FIG. 4, the architecture of the crossbar array circuit may have structural and physical similarities to the convolutional neural network (CNN) of the present disclosure.

In the first layer, unit size filters with unit width and length represents the function of the cell to implement the d(') dynamics. In the deeper layer, if the crossbar array is designed to accumulate current along a column, the filter learns column wise. Learning in the column direction of the filter may proceed until the height of a feature map becomes 1, and the width of the feature map may be maintained or may be half or multiple of the array width. Since the row information is compressed through the layers in the array and the column information is maintained, until the row value is 1, the column value is maintained, or half of the initial value (half of the initial value is RRAM+PS32 as in the case of Table 1, when two columns are used as a weight vector in pairs). Also, through deeper layers, the neural network can learn other non-linear behaviors in C(').

To ensure this assumption, in this application, the depth has the same value of 1, the first layer is fixed to a filter with a length and a width of 1, and a 3D convolution neural networks (3D-CNN) in which the size of the length or width of the filter increases after the second layer may be employed. Through the above structure, it is possible to optimize the neural network and the neural network may have structural similarity with the crossbar array circuit. The filter may be learned to scan all memory cells of all crossbar arrays within a processing element to make the filter more general. Each filter in the neural network is free from the structure and size of the crossbar array as it is shared along the depth of the input feature map or the hidden feature map.

Figure 5:
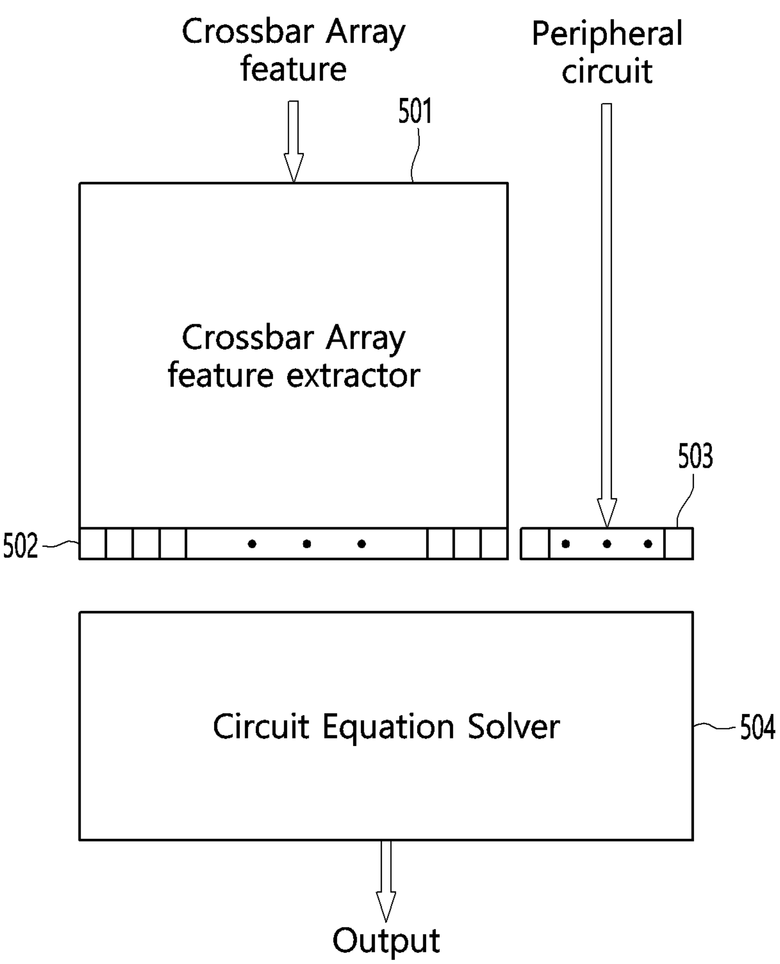
FIG. 5 illustrates an overall structure of a neural network according to various embodiments of the present application.

FIG. 5 illustrates an overall structure of a neural network according to various embodiments of the present application.

The neural network of the present application, which emulates an analog computing block such as a processing element, may be composed of two parts. For example, the neural network is composed of a crossbar array feature extractor 501 and a circuit equation solver 504, so that an output 502 of the crossbar array feature extractor 501 may be input to the circuit equation solver 504. The crossbar array feature extractor emulates the function of the crossbar array ([Equation 1]) and extracts a latent feature vector as a result.

The latent feature vector may be concatenated with features of peripheral circuits and applied as an input of the circuit equation solver. The circuit equation solver serves as a function that calculates the output of the analog computing block by receiving the latent feature vector of the crossbar array and the features of peripheral circuits as input. Since a neural network finds a solution of a specific partial differential equation or ordinary differential equation, a Fully Connected Neural Network (FCNN) or Neural Ordinary Differential Equation (ODE) can be used as a circuit equation solver.

Since the peripheral circuit is an analog style circuit, the MOSFET's threshold and other key parameters of the circuit must be given as features to the circuit equation solver. The features of the peripheral circuits 503 described above can be concatenated to the latent feature vector of the crossbar array as a new input of the circuit equation solver 504, allowing the circuit equations of the series of processing elements, including the entire crossbar array, to be solved.

As described above, since the circuit parameters of the peripheral circuit can be input into the circuit equation solver 504 as a concatenated latent feature, it is possible to use not only an analog-to-digital converter but also various other circuits for the analog computing to be implemented, it has the advantage of not limiting selection of the type of processing element. In order to verify the validity of the proposed neural network architecture, we can provide conditions such as the number of training data and epochs required for the neural network learning by defining the upper limit of the error between the SPICE simulation results and the predicted values of the neural network. Since the neural network is trained on the framework along with the machine learning framework, it has the advantage of being able to run on the GPU with little error compared to the SPICE results, reducing the simulation time.

Figure 7A:
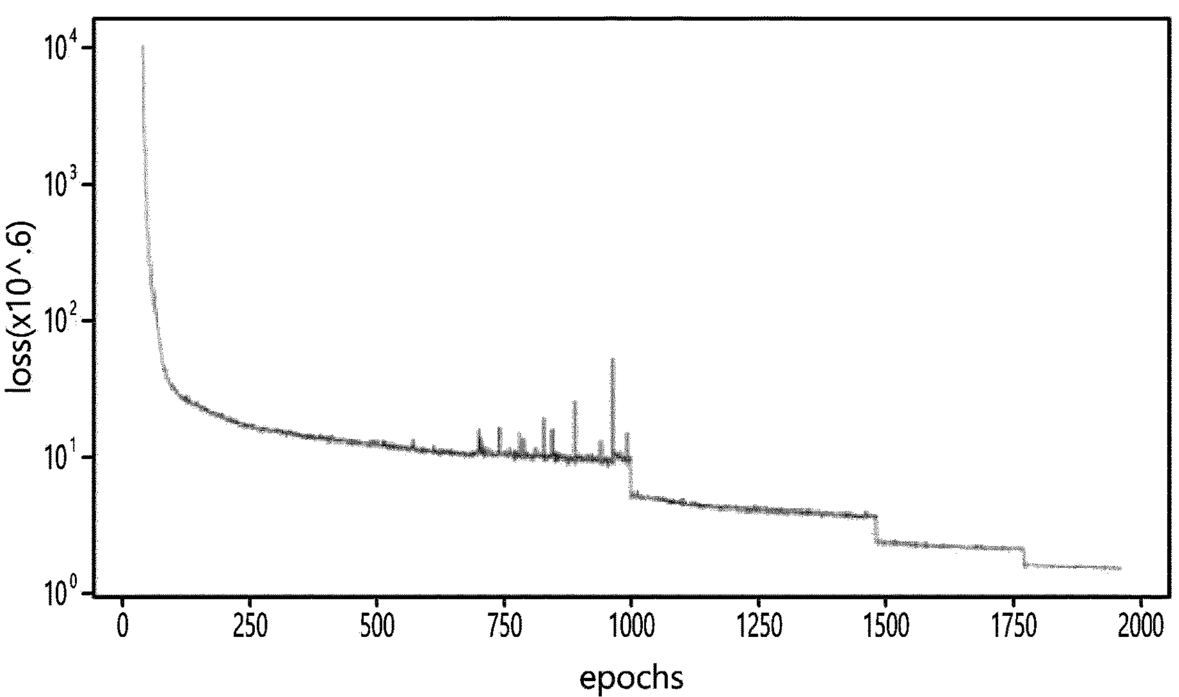
FIGS. 7A and 7B are graphs showing training and test loss for RRAM and S32 cases according to one embodiment of the present disclosure.
Figure 7B:
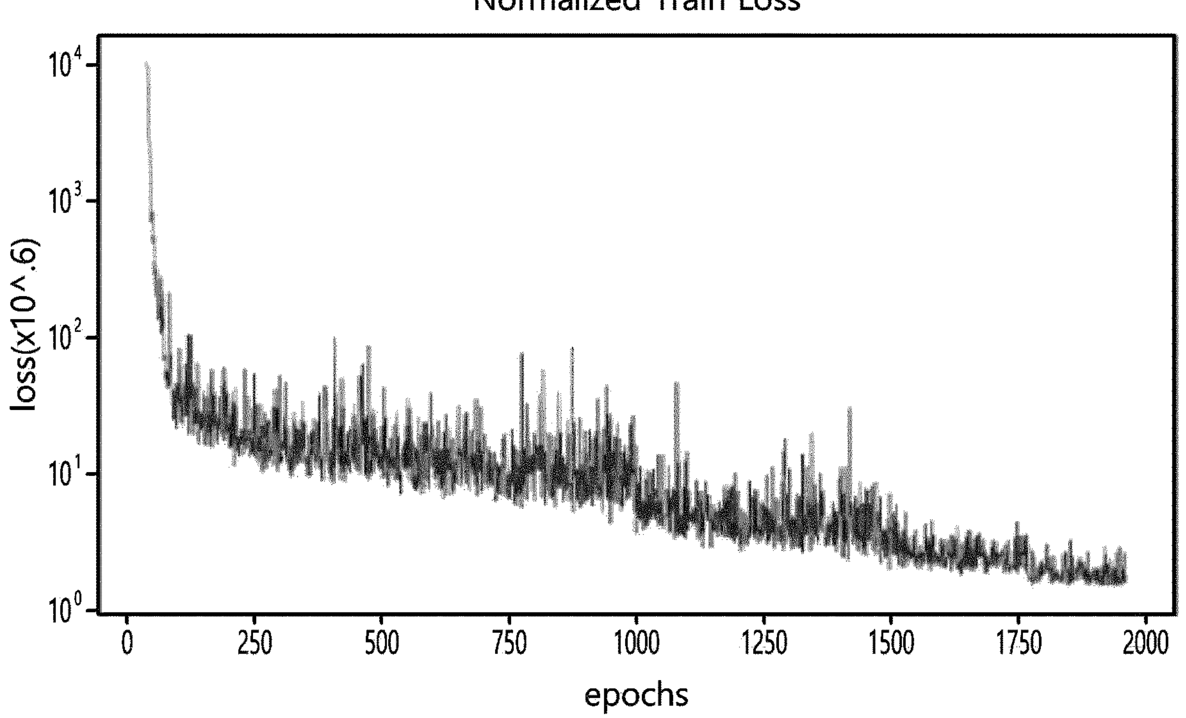
Figure 8A:
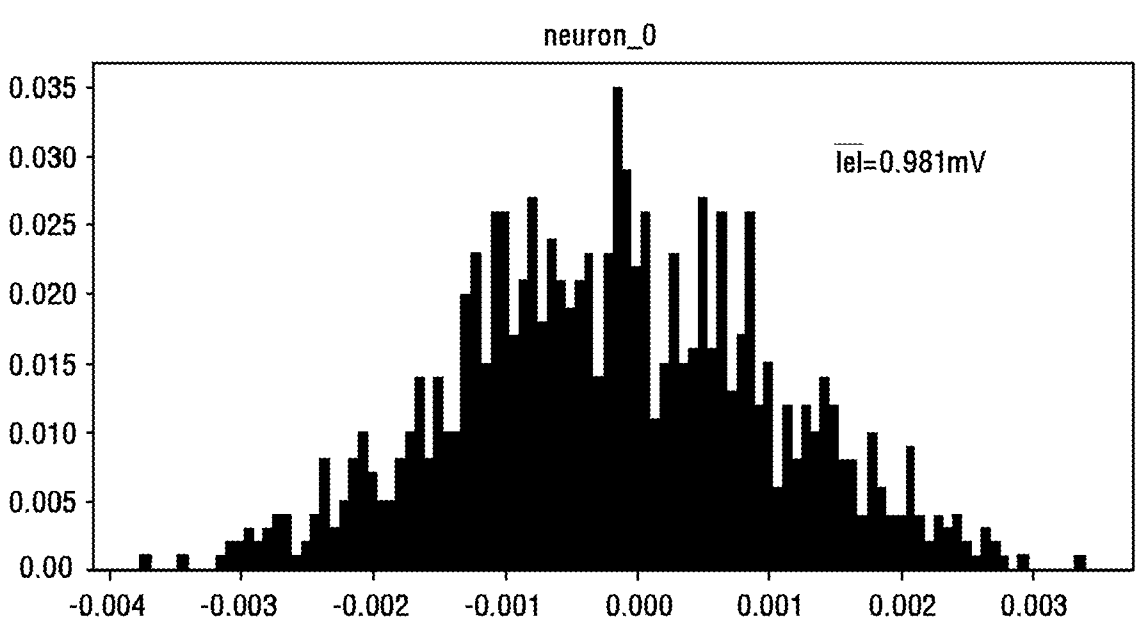
FIG. 8A to 8E show the simulation result according to the simulation of the present application.
Figure 8B:
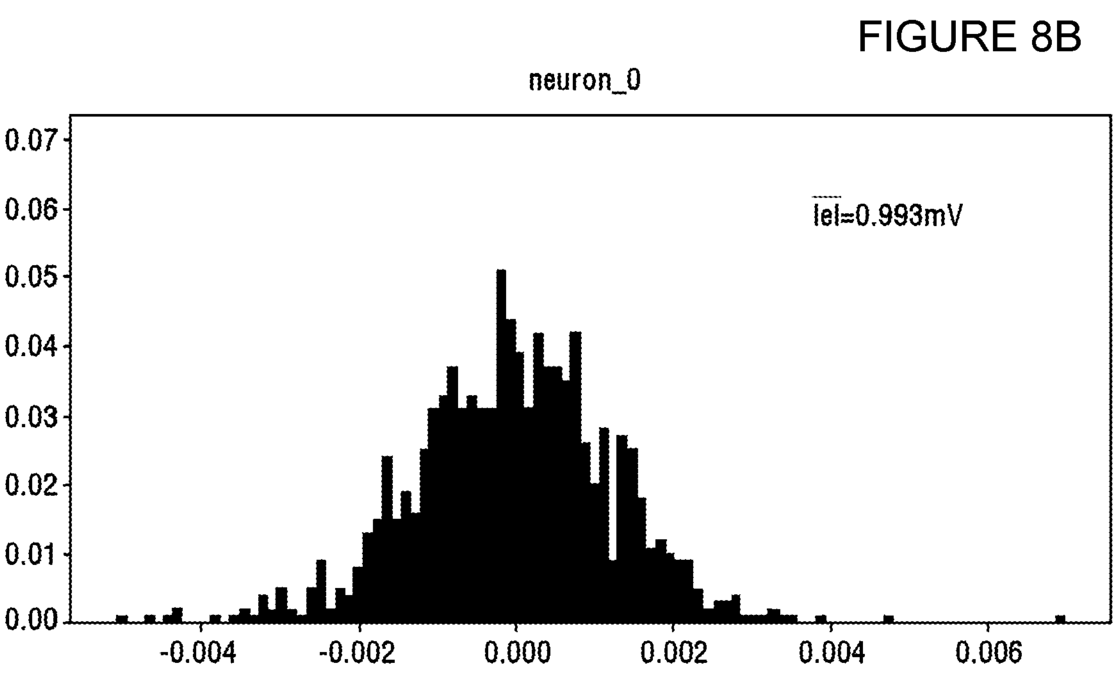
Figure 8C:
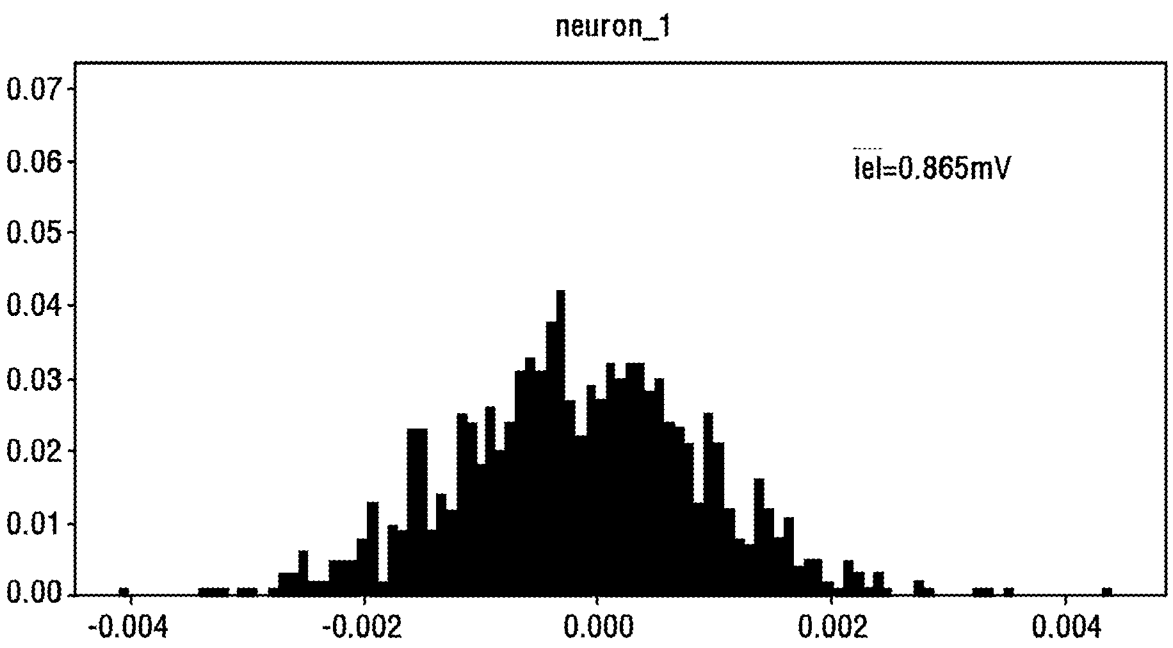
Figure 8D:
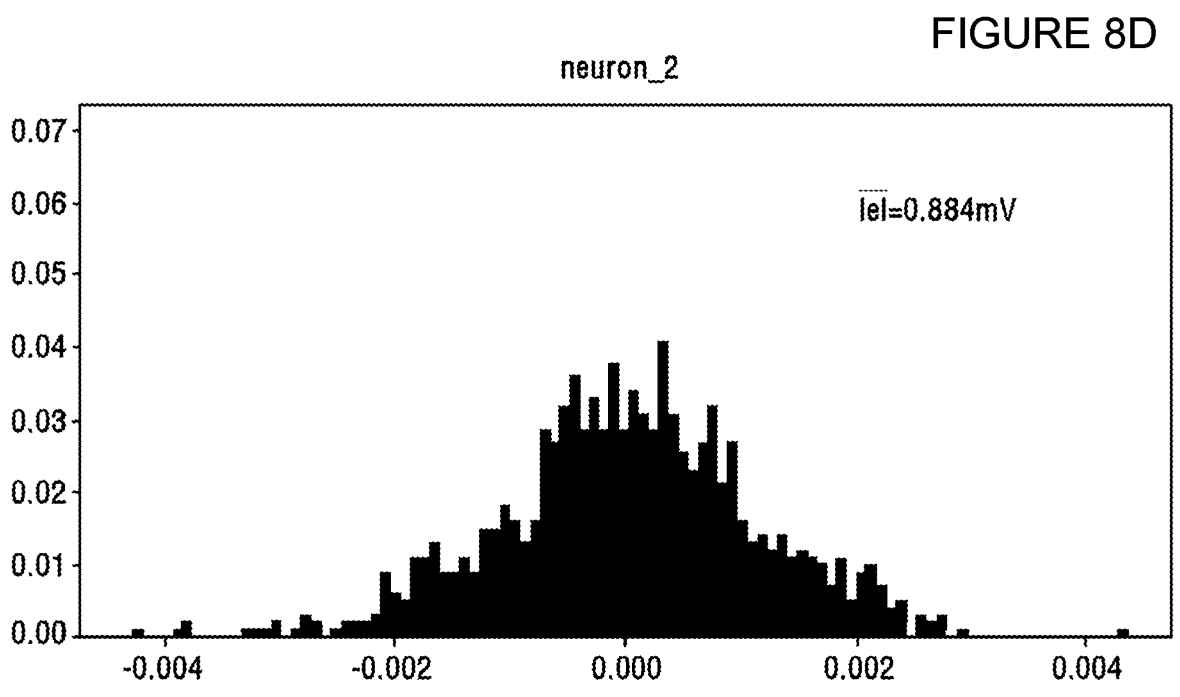
Figure 8E:
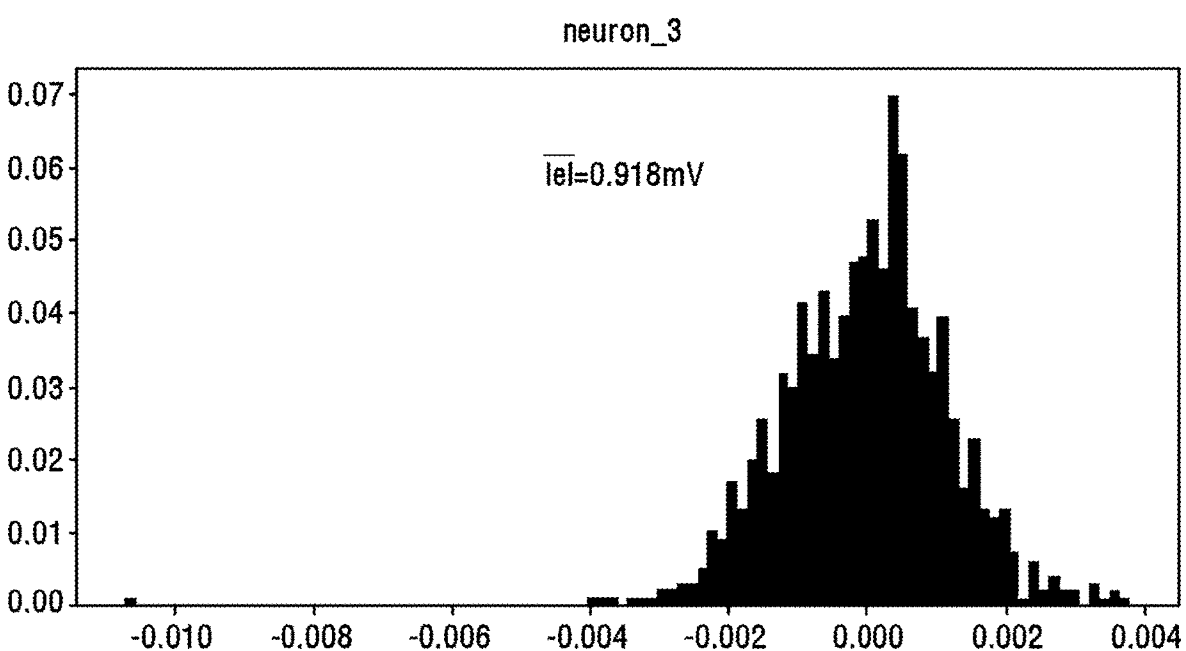

FIG. 6 is a diagram for explaining the RRAM and PS32 case according to an embodiment of the present application. FIGS. 7A and 7B are graphs showing training loss and test loss for RRAM and PS32 cases according to one embodiment of the present disclosure. FIG. 8A to 8E show the simulation result according to the simulation of the present application.

The RRAM and PS32 cases described herein may be implemented based on the drawing shown in FIG. 4 of Korean Patent No. 10-1991041. FIG. 6 is a diagram showing an example of an architecture in which a binary artificial neural network to which the present invention can be applied is designed using an analog circuit.

In FIG. 6, (a) indicates a synaptic weight array, (b) indicates a neuron sub-array, (c) indicates a partial sum circuit, and (d) indicates a comparator.

In FIG. 6, a plurality of synapses having a value of 0 or 1 exist in a neuron, and one bias expressed as an integer or a floating point number exists. In the architecture of FIG. 4, several synaptic weights and biases are expressed using ReRAM crossbars in a 1T1R (1 Transistor 1 Resistor) structure. The weight has state values of −1, 1, and 0 (0 indicates that the weight is not used), and two 1T1R cells are used per one weight to express the weight value. Unlike the weight, the bias has an integer value, and a plurality of cells are used to express the bias.

In FIG. 6, each ReRAM is programmed to have a High Resistance State (HRS) or Low Resistance State (LRS), and is connected to a Positive Bit Line (BL_P) or Negative Bit Line (BL_N), respectively. The input value is transmitted through the WL (Word Line), the current flows through the ReRAM cell, and is added to BL_P or BL_N. The PS32 (PartialSum32) circuit subtracts the current flowing through BL_P and BL_N and converts it into a voltage. The comparator compares with the reference voltage (Vref) and outputs a 0V or VDD voltage signal as the output value of the neuron. The corresponding output value corresponds to the activation value 0 or 1 of the neuron. If the size of the ReRAM crossbar is too large, the operating features of the circuit deteriorate, so up to 32 ReRAM cells are connected to each BL_P/BL_N line. If one neuron has more than 32 synapses, multiple PS32 circuits are connected in parallel through a resistor to the + terminal of a comparator and compare the average value of multiple PS32 output voltages with Vref to determine the neuron output value.

If one neuron has more than 32 synapses, multiple PS32 circuits are connected in parallel through a resistor to the + terminal of a comparator and compare the average value of multiple PS32 output voltages with Vref to determine the neuron output value.

Referring to FIGS. 7A and 7B, RRAM+PS32 compares learning rates in the state where a 1T1R cell is used as an analog memory unit and a customized analog circuit PS32 for a processing element is used. In the present application, unlike the aforementioned Korean Patent No. 10-1991041, even though the hardware structure of FIG. 6 is borrowed, the weight and active value are set to have real numbers. Referring to FIGS. 7A and 7B, the learning rate is halved at 1000, 1500, and 1800 epochs. Since the training and test losses decrease aligned, we can expect that the neural network finds an optimal set of parameters. Nesterov optimizer which is a kind of momentum-based gradient descent optimization method is used to train the neural network.

Since analog computing using processing elements is a kind of continuous function, it is not infallible to believe that the error of the trained neural network herein is small enough. For example, a neural network accelerator constructed by repeatedly using approximated processing elements may accumulate and amplify errors. In order to avoid error amplification, according to the applications of the processing element, it should be preceded setting the upper limit of the error of the emulated processing element. In this sense, it is necessary to evaluate a trained neural network by observing its training or validation process.

TABLE 1

| Processing element | Input(C, D, H, W) | Output(O) | Data(N) | MAE |
|---|---|---|---|---|
| RRAM + PS32 | (2, 4, 64, 2) | 1 voltage | 50,000 | 0.981(mV) |
| RRAM + PS32 | (2, 2, 64, 8) | 4 voltage | 50,000 | 0.915(mV) |

Table 1 shows the experimental results of processing elements. Here, the input can have four axes: the index of memory cell features (C), crossbar arrays (D), rows (H), and columns (W) in a crossbar array. The output is the output of the processing element, and may be voltage, current, etc., but the output value in Table 1 is set to have a voltage value. MAE (mean-absolute-error) can be the error between the expected value and the result of SPICE simulation. The average absolute error of the test data set is low enough to close the gap between the SPICE simulation results. The average absolute error in this experiment is less than 1 mV, where the effective bit of the SPICE simulation is set to 0.1 mV. Considering that the range of the output swing is thousands of times greater than the valid bits (0 to 1.5V), this error is trivial.

In addition, Table 1 shows experimental results for various processing elements using the neural network of the present application. The neural network training and test data of the present application are generated according to the following process: 1) Parameters which are set as variables among the parameters of the crossbar array and peripheral circuits are extracted from a uniform distribution within the permissible range of each parameter. 2) The SPICE simulation results are configured as ground-truth values for the corresponding input parameters, and the input parameters are normalized to form training and test data.

RRAM+PS32 uses 1T1R cells for the analog memory unit and a customized analog circuit PS32 for the processing element. In this experiment, we assume two cases of one MAC unit for the processing element and four MAC units for the processing element. As shown in FIGS. 7A and 7B, the training and test losses decreases aligned with little gap, which means that the neural network is neither overfitted nor underfitted.

TABLE 2

| Processing element | Neural Network Architecture |
|---|---|
| RRAM + PS32 | Conv3d(2, 16, (1, 1, 1), (1, 1, 1))-CELU-Conv3d(16, 8, (1, 2, 1), (1, 2, 1))-CELU-Conv3d(8, 4, (1, 4, 1), (1, 4, 1))-CELU-Conv3d(4, 32, (1, 8, 1), (1, 8, 1))-CELU-Conv3d(32, 32, (1, 1, 2), (1, 1, 2))-CELU-Linear(128, 32)-CELU-Linear(32, 16)-CELU-Linear(16, 1) |
| RRAM + PS32 | Conv3d(2, 16, (1, 1, 1), (1, 1, 1))-CELU-Conv3d(16, 8, (1, 2, 1), (1, 2, 1))-CELU-Conv3d(8, 4, (1, 4, 1), (1, 4, 1))-CELU-Conv3d(4, 32, (1, 8, 1), (1, 8, 1))-CELU-Conv3d(32, 32, (1, 1, 2), (1, 1, 2))-CELU-Linear(256, 32)-CELU-Linear(32, 16)-CELU-Linear(16, 1) |

Table 2 shows the neural network architecture to emulate the RRAM+PS32 processing element herein. As shown in Table 2, the format may be implemented in the form of Conv3d(in_channels, out channels, kernel size=(D,H,W), stride_size=(D,H,W), padding=(0,0,0)), Linear(in_features, out_features). In this case, D, H, and W may be depth, height, and width, respectively.

For the processing element having the structure of RRAM+PS32 (refer to Table 1, since (C, D, H, W)=(2, 4, 64, 2) as an input, the gate voltage and conductance of the memory device of a memory cell are assigned as the characteristic of one memory cell: C=2. We assume that there are four 64*2 arrays in the processing element: D=4, H=64, W=2. With the aforementioned input shape of (C, D, H, W)=(2, 4, 64, 2), the first layer is modularized as Conv3d(2,16,(1,1,1),(1,1,1)), where 2 is fixed because it must match the number of input channels, and 16 is the number of filters to be used in the first layer, so it may vary according to user definition or optimization. Since the filter size is (1,1,1), the filter of the first layer corresponds to one memory cell, and the size of one filter including actual channels is (in_channels, D, H, W)=(2,1,1,1) The filter follows He initialization when it is initialized. CELU is used as the activation function, which can also be changed according to user definition.

The second layer is Conv3d(16,8,(1,2,1),(1,2,1)). Thus, the actual size of one filter is (in_channels, D, H, W)=(16, 1,2,1), C=16 may be equal to the number of filters used in the first layer. By setting H=2, the second layer may learn information about two memory cells that are exclusively adjacent and located in the same row in the crossbar array.

By leaving the stride equal to the filter size, the present application has advantage of sliding the kernel over "exclusively contiguous" memory cells. The weak condition for the activation function is that the function should be smooth such as CELU. Proceed in this way, and finally when the height of the feature map becomes 1, there is a layer that performs operation on two columns using that the width of Conv3d(32,32,(1,1,2),(1,1,2)) is 2.

The last layer was added as above, because exclusively adjacent pairs of two columns of the crossbar array form a positive partial sum and a negative partial sum respectively. It can be omitted depending on the structure of the processing element. The core of the present application is to build layers in the neural network structure of the present application and to make the height of the last feature map 1 so that the feature map serves as a latent feature representing the current sum of each column.

In the neural network implemented in this application, it plays a role of extracting features for each column of the crossbar array, we may flatten the feature map to make it into a one-dimensional vector, and then stack fully connected neural networks and finally derive the result value obtained from the processing elements (corresponding to the circuit equation solver 504 of FIG. 5 of the present application). Since the exemplary processing element has one output value, one output voltage can be finally extracted through Linear(16,1). According to another embodiment, the processing element may be implemented to have four output values, and in this case, four output voltages may be finally extracted by passing through Linear (16,4). A latent feature vector may be formed by concatenating features of peripheral circuits.

FIGS. 8A to 8E shows the error distribution for the test data in Table 1. FIG. 6C illustrates the probability density function of the error compared with the result simulated by the method implemented in the present application and the result of SPICE simulation. The x-axis is the error value between prediction by the neural network and the ground-truth value, and the y-axis is the relative frequency (probability density). Graph (a) is the result of the experiment in the first row of Table 1, and graphs (b), (c), (d), and (e) are the results of the experiment in the second row of Table 1.

Various other elements may be included and required to provide aspects of the teachings of this specification. By way of example, additional materials, combinations of materials, and/or omission of materials may be used to provide additional embodiments that are within the scope of the teachings herein.

When introducing elements of the present application or embodiment(s) thereof, modifiers such as "a", "an", and "the" are intended to mean that there may be more than one element. Similarly, when used to introduce an element, a modifier such as "other" is intended to mean one or more elements. Terms such as "comprising" and "having" are intended to be inclusive, so that there may be additional elements other than those listed. The term "example" is intended to represent one of several possible examples and should not necessarily be construed as representing the best or best embodiment. However, in some cases, the exemplary embodiments may actually represent the best or best embodiments.

Although the present application has been described with reference to exemplary embodiments, those skilled in the art will understand that various changes may be made and equivalents may be substituted for elements thereof without departing from the scope of the invention. Furthermore, those skilled in the art will appreciate that many modifications are possible to adapt a particular tool, situation, or material to the teachings of the present invention without departing from its essential scope. Accordingly, it is intended that the present invention not be limited to the particular embodiment disclosed as the best mode contemplated for implementing the present invention, but that the present invention will include all embodiments falling within the scope of the appended claims.

What is claimed is:

1. A method for solving circuit equations of a processing element (PE) using a neural network, the method being performed by a graphic processing unit (GPU), the method comprising:

forming, in the neural network, M aligned virtual cell arrays, each of the M aligned virtual cell arrays comprising a plurality of memory cells, wherein the M aligned virtual cell arrays have a height value N and a width value O, and each of the M aligned virtual cell arrays corresponds to a crossbar array circuit included in the processing element;

performing a 3D convolution on each of the M aligned virtual cell arrays until the height value N of each of the M aligned virtual cell arrays becomes 1;

inputting parameters of the plurality of memory cells of the crossbar array circuit to each of the M aligned virtual cell arrays in which the 3D convolution is performed; and solving a circuit equation of the processing element using an output value generated from the M aligned virtual cell arrays.

2. The method of claim 1, wherein each of the plurality of memory cells consists of one resistor memory and one transistor, one resistor memory and one selector, or one resistor memory.

3. The method of claim 1, wherein the parameters of the plurality of memory cells comprises parameters which are set as variables from parameters of a conductance of a memory element of the memory cell, a voltage applied to the memory cell, a threshold voltage of the memory cell, and a width/length ratio of a transistor of the memory cell.

4. The method of claim 1, wherein the processing element further comprises peripheral circuitry, and wherein the method further comprises solving a circuit equation of the processing element using the output value and circuit characteristics of the peripheral circuit.

5. The method of claim 4, wherein solving the circuit equation of the processing element comprises solving the circuit equation using a Fully Connected Neural Network (FCNN) or Neural Ordinary Differential Equation (ODE).

6. The method of claim 1, wherein the 3D convolution is performed over M arrays.

7. A device for solving circuit equations of a processing element (PE) using a neural network, the device comprising a graphic processing unit (GPU) configured to:

form, in the neural network, M aligned virtual cell arrays, each of the M aligned virtual cell arrays comprising a plurality of memory cells, wherein the M aligned virtual cell arrays have a height value N and a width value O, and each of the M aligned virtual cell arrays corresponds to a crossbar array circuit included in the processing element;

perform a 3D convolution on each of the M aligned virtual cell arrays until the height value N of each of the M aligned virtual cell arrays becomes 1;

input parameters of the plurality of memory cells of the crossbar array circuit to each of the M aligned virtual cell arrays in which the 3D convolution is performed; and solve a circuit equation of the processing element using an output value generated from the M aligned virtual cell arrays.

8. The device according to claim 7, wherein each memory cell of the plurality of memory cells consists of one resistor memory and one transistor, one resistor memory and one selector, or one resistor memory, and wherein the parameters of the plurality of memory cells comprises parameters which are set as variables from parameters of the conductance of a memory element of the memory cell, the voltage applied to the memory cell, the threshold voltage of the memory cell, and the width/length ratio of the transistor of the memory cell.

9. The device according to claim 7, wherein the processing element further comprises peripheral circuitry and wherein the graphic processing unit is configured to solve a circuit equation of the processing element using the output value and circuit characteristics of the peripheral circuit.

10. The device according to claim 7 wherein the graphic processing unit is configured to solve the circuit equation using a Fully Connected Neural Network (FCNN) or Neural Ordinary Differential Equation (ODE).

* * * * *